(12) United States Patent
Li et al.

(10) Patent No.: US 10,885,670 B2
(45) Date of Patent: Jan. 5, 2021

(54) STEREO VISION MEASURING SYSTEM AND STEREO VISION MEASURING METHOD

(71) Applicant: BOE TECHNOLOGY GROUP CO., LTD., Beijing (CN)

(72) Inventors: Yongxiang Li, Beijing (CN); Lijie Zhang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/941,179

(22) Filed: Mar. 30, 2018

(65) Prior Publication Data
US 2019/0012809 A1 Jan. 10, 2019

(30) Foreign Application Priority Data
Jul. 7, 2017 (CN) .......................... 2017 1 0550921

(51) Int. Cl.
*G06F 3/01* (2006.01)
*G06T 7/80* (2017.01)
*G06T 7/593* (2017.01)

(52) U.S. Cl.
CPC ............... *G06T 7/85* (2017.01); *G06F 3/011* (2013.01); *G06F 3/017* (2013.01); *G06T 7/593* (2017.01); *G06T 2207/10012* (2013.01)

(58) Field of Classification Search
CPC ............ G06T 7/85; G06F 3/011; G06F 3/017
See application file for complete search history.

(56) References Cited

U.S. PATENT DOCUMENTS

2014/0269757 A1   9/2014  Park et al.
2015/0030314 A1   1/2015  Skarakis
(Continued)

FOREIGN PATENT DOCUMENTS

CN   101086681 A   12/2007
CN   103607612 A    2/2014
(Continued)

OTHER PUBLICATIONS

Gao Chen, "Smart PHones can Realize Somatosensory operation without buying kinect", https://www.ifanr.com/441799, Aug. 12, 2014.
(Continued)

*Primary Examiner* — Robert J Michaud
(74) *Attorney, Agent, or Firm* — Dilworth & Barrese, LLP.; Michael J. Musella, Esq.

(57) ABSTRACT

A stereo vision measuring system and measuring method are provided. The system includes a main control device and at least two cooperation devices; each of the cooperation devices is a movable device, and is provided with an image acquiring part; the cooperation device is configured to acquire a first image of a first scene and first image information of the first image and transmit them to the main control device in a calibrating phase, and the cooperation device is further configured to acquire a second image of a second scene and second image information of the second image, and transmit the second image information to the main control device in a measuring phase; the main control device is configured to acquire parameter information of the image acquiring parts in the calibrating phase; the main control device is further configured to obtain three-dimensional reconstruction information of the second scene.

20 Claims, 8 Drawing Sheets

(56) References Cited

U.S. PATENT DOCUMENTS

| | | | | |
|---|---|---|---|---|
| 2015/0124060 A1* | 5/2015 | Hasegawa | ............ | H04N 13/243 |
| | | | | 348/47 |
| 2017/0199366 A1* | 7/2017 | Rappel | ................ | G02B 21/365 |

FOREIGN PATENT DOCUMENTS

| | | | |
|---|---|---|---|
| CN | 103634629 A | | 3/2014 |
| CN | 104052562 A | | 9/2014 |
| CN | 104537707 A | * | 4/2015 |
| CN | 104537707 A | | 4/2015 |
| CN | 105763905 A | | 7/2016 |
| CN | 106331854 A | | 1/2017 |
| CN | 106500626 A | | 3/2017 |

OTHER PUBLICATIONS

First Chinese Office Action dated Jan. 3, 2019.
Publication: «modern electronics technique» vol. 38, No. 23, Release date:Dec. 1, 2015; Author:Zhixian, Zhang etc.; Title: Multi-view camera calibration technology based on Halcon.
Second Chinese Office Action dated Sep. 9, 2019.

* cited by examiner

FIG. 10 in a calibrating phase, acquiring a first image of a first scene and first image information of the first image and transmitting the first image and the first image information to a main control device, by at least two cooperation devices, respectively; the main control device being communicatively connected with the at least two cooperation devices, and configured to control the cooperation devices, each of the cooperation devices being a movable device with an image acquiring part; the main control device being configured to acquire parameter information of the image acquiring part in the calibrating phase in a measuring phase, acquiring a second image of a second scene and second image information of the second image and transmitting the second image information to the main control device, by the cooperation device; and obtaining three-dimensional reconstruction information of the second scene by the main control device according to the parameter information and the second image information

STEREO VISION MEASURING SYSTEM AND STEREO VISION MEASURING METHOD

CROSS REFERENCE TO RELATED APPLICATIONS

The application claims priority to the Chinese patent application No. 201710550921.9, filed on Jul. 7, 2017, the entire disclosure of which is incorporated herein by reference as part of the present application.

TECHNICAL FIELD

At least one embodiment of the present disclosure relates to a stereo vision measuring system and a stereo vision measuring method.

BACKGROUND

Currently, there are many applications that focus on three-dimensional scene reconstruction, such as somatosensory games, virtual reality movie etc., about the smart television. The key of these applications is to recognize three-dimensional data information, such as a position and a gesture of a user in a scene etc.

SUMMARY

At least one embodiment of the disclosure relates to a stereo vision measuring system and a stereo vision measuring method, which can construct a three-dimensional vision reconstruction system with a plurality of image acquiring parts, to achieve the long distance/adjustable distance stereo measurement with the plurality of the image acquiring parts.

At least one embodiment of the disclosure provides a stereo vision measuring system, comprising a main control device and at least two cooperation devices, wherein the main device is communicatively connected with the at least two cooperation devices and configured to control the cooperation devices; each of the cooperation devices is a movable device with an image acquiring part;

the cooperation device is configured to acquire a first image of a first scene and first image information of the first image and transmit the first image and the first image information to the main control device in a calibrating phase, and the cooperation device is further configured to acquire a second image of a second scene and second image information of the second image and transmit the second image information to the main control device in a measuring phase;

the main control device is configured to acquire parameter information of the image acquiring parts in the calibrating phase; the main control device is further configured to obtain three-dimensional reconstruction information of the second scene according to the parameter information and the second image information in the measuring phase.

According to a stereo vision measuring system provided by an embodiment of the disclosure, the main control device comprises a calibrating part configured to acquire the parameter information of the image acquiring parts according to the first image and the first image information transmitted from the cooperation device.

According to a stereo vision measuring system provided by an embodiment of the disclosure, the parameter information comprises an internal parameter and an external parameter, the internal parameter is a physical parameter of the image acquiring part, and the external parameter is a position relationship between the image acquiring parts.

According to a stereo vision measuring system provided by an embodiment of the disclosure, the calibrating part is configured to divide the image acquiring parts into groups, each of the groups comprises two of the image acquiring parts, and the image acquiring parts are matched in pairs to be calibrated.

According to a stereo vision measuring system provided by an embodiment of the disclosure, the main control device comprises a three-dimensional data forming part configured to obtain the three-dimensional reconstruction information according to the parameter information and the second image information transmitted from the cooperation device.

According to a stereo vision measuring system provided by an embodiment of the disclosure, the cooperation device comprises an image processing part, the first image information comprises first key point information, the second image information comprises second key point information, and the image processing part is configured to extract the first key point information in the calibrating phase and extract the second key point information in the measuring phase.

According to a stereo vision measuring system provided by an embodiment of the disclosure, the three-dimensional data forming part comprises a key point combining unit, a three-dimensional space coordinate calculating unit and a key point data counting unit, the key point combining unit is configured to perform key point matching according to the second key point information transmitted from the cooperation device to select a key point combination that is successfully matched, the three-dimensional space coordinate calculating unit is configured to calculate to obtain a three-dimensional space coordinate of the key point combination according to the key point combination and the parameter information; the key point data counting unit is configured to count key point data of a key region, to complete stereo vision calculation, and obtain the three-dimensional reconstruction information.

According to a stereo vision measuring system provided by an embodiment of the disclosure, the main control device comprises a smart television and the cooperation device comprises a movable terminal.

At least one embodiment of the disclosure further provides a stereo vision measuring method, comprising:

in a calibrating phase, acquiring a first image of a first scene and first image information of the first image and transmitting the first image and the first image information to a main control device, by at least two cooperation devices, respectively; the main control device being communicatively connected with the at least two cooperation devices, and configured to control the cooperation devices, each of the cooperation devices being a movable device with an image acquiring part; the main control device being configured to acquire parameter information of the image acquiring part in the calibrating phase;

in a measuring phase, acquiring a second image of a second scene and second image information of the second image and transmitting the second image information to the main control device, by the cooperation device; and obtaining three-dimensional reconstruction information of the second scene by the main control device according to the parameter information and the second image information.

According to a stereo vision measuring method provided by an embodiment of the disclosure, the method further comprising determining the parameter information of the image acquiring parts according to the first image and the first image information transmitted from the cooperation device, by the main control device.

According to a stereo vision measuring method provided by an embodiment of the disclosure, the parameter information comprises an internal parameter and an external parameter, the internal parameter is a physical parameter of the image acquiring part, and the external parameter is a position relationship between the image acquiring parts.

According to a stereo vision measuring method provided by an embodiment of the disclosure, the first image information comprises first key point information, and the second image information comprises a second key point information.

According to a stereo vision measuring method provided by an embodiment of the disclosure, the method further comprising: performing a key point matching according to the second key point information transmitted from the cooperation device to select a key point combination that is successfully matched, and calculating to obtain a three-dimensional space coordinate of the key point combination according to the key point combination and the parameter information; counting key point data in a key point region, to complete stereo vision calculation and obtain the three-dimensional reconstruction information.

According to a stereo vision measuring method provided by an embodiment of the disclosure, the image acquiring parts are divided into groups by the main control device, and each of the groups comprises two of the image acquiring parts, to form at least one group of binocular stereo vision measuring unit.

According to a stereo vision measuring method provided by an embodiment of the disclosure, the method further comprising, synchronizing signals of the main control device and the cooperation device in at least one of the calibrating phase and the measuring phase, wherein synchronizing signals of the main control device and the cooperation devices comprises: acquiring network delay.

According to a stereo vision measuring method provided by an embodiment of the disclosure, acquiring the network delay comprises: continuously transmitting two messages to the cooperation device by the main control device, and immediately returning them after receiving them by the cooperation device, wherein a time interval of receiving the two returned messages by the main control device is the network delay of communication between the main control device and the cooperation device.

According to a stereo vision measuring method provided by an embodiment of the disclosure, the method further comprising, synchronizing signals of the main control device and the cooperation device, in at least one of the calibrating phase and the measuring phase.

According to a stereo vision measuring method provided by an embodiment of the disclosure, synchronizing signals of the main device and the cooperation device comprising: synchronously acquiring;

the synchronously acquiring comprises: transmitting a first time stamp and a collect instruction together to the cooperation device by the main control device, obtaining the collect instruction and acquiring an image by the cooperation device, returning a second time stamp and image information obtained from processing the image to the main control device by the cooperation device; and aligning the image information of the cooperation devices by the main control device according to the second time stamp received by the main control device, the image comprising the first image or the second image, and the image information comprising the first image information or the second image information.

According to a stereo vision measuring method provided by an embodiment of the disclosure, the main control device comprises a smart television, and the cooperation device comprises a movable terminal.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

In order to run applications, based on three-dimensional scene measurement, such as somatosensory games etc., by a conventional smart television, the user needs to purchase an additional corresponding three-dimensional measuring device, e.g. Kinect from Microsoft etc., to recognize three-dimensional data information such as a position and a gesture of a user in a scene etc. However, such a three-dimensional measuring device has at least following drawbacks.

First, the user is required to be far from the three-dimensional measuring device. Because the three-dimensional measuring device is fixed on a support, considering a size of the measuring device and a distance between cameras cannot be too long, the user must stand at a distance from the cameras, so that an effective measurement can be performed. For example, the Kinect requires user to be 1.2 meters away from the measuring device (in practice, 1.5 meters is generally required), which greatly increases use restriction of the measuring device.

Second, a size of the scene is limited. From a principle of the stereo vision, the larger the distance between the cameras is, the more accurate the measurement is, and the shorter the distance between a user and the cameras is. However, a conventional measuring device is a separate device, and two cameras of the conventional measuring device are generally fixed on a support in parallel. Because a distance between the cameras is limited to be shorter than a predetermined length due to the size requirement of the measuring device, an effective measuring distance is short. Similarly, considering the size, the conventional device only carries two cameras, so the user which is just in front of the camera can be effectively measured, and accurate data cannot be acquired for multi-users at a scene in a large angle.

Third, the scene angle is limited. Because a conventional measuring device is at most provided with two cameras, and once the measuring device is amounted in a use environment, for example, an upper edge of a television set, it can not be changed. Thus, when different users having different heights or multiple users appear in a scene at the same time, a measuring accuracy of the conventional device will be decreased greatly, the measuring device cannot even be used or a re-calibration is required.

Figure 1A:
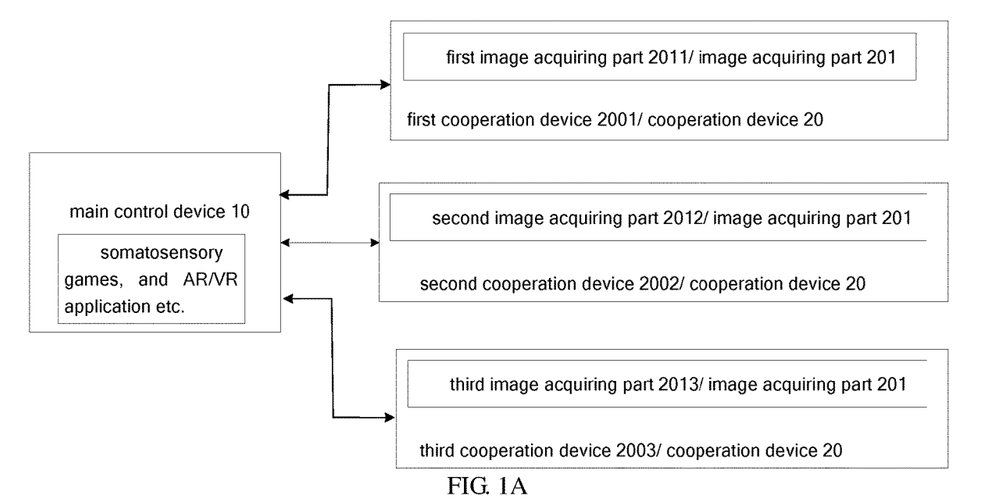
FIG. 1A is a schematic diagram illustrating a stereo vision measuring system provided by an embodiment of the disclosure.

As illustrated in FIG. 1A, at least one embodiment of the disclosure provides a stereo vision measuring system, including a main control device 10 and at least two cooperation devices 20, the main control device 10 is communicatively connected with the at least two cooperation devices 20, and the main control device 10 is configured to control the cooperation devices 20. Each of the cooperation devices can be a movable device with an image acquiring part 201.

FIG. 1A illustrates three cooperation devices 20: a first cooperation device 2001, a second cooperation device 2002 and a third cooperation device 2003, and each of the cooperation device 20 includes the image acquiring part 201. That is, the first cooperation device 2001 includes a first image acquiring part 2011, the second cooperation device 2002 includes a second image acquiring part 2012, and the third cooperation device 2003 includes a third image acquiring part 2013. The image acquiring part 201 of each of the cooperation devices 20 can be configured to acquire an image of a scene.

For example, the images acquired by the image acquiring parts 201 of the cooperation devices 20 can be images in different view angles of the same scene. For example, the images acquired by the image acquiring parts 201 of the cooperation devices 20 can be images in different view angles of the same scene at the same time. For example, each of the cooperation devices can be responsible for communicating with the main control device, and turning on the image acquiring part to acquire current scene video images, detecting key points of the images and recognizing a predetermined target (for example, a face and a body gesture of a human, etc.). For example, the main control device is communicatively connected with each of the cooperation devices 20 in a manner not limited to communication connections realized by communication techniques based on Wi-Fi, Bluetooth, near field communication (NFC) or 3G, 4G movable communication network etc.

Figure 1B:
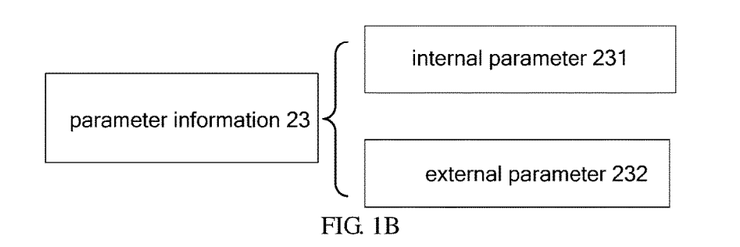
FIG. 1B is a schematic diagram illustrating parameter information of a stereo vision measuring system provided by an embodiment of the disclosure.

As illustrated in FIG. 1B, the main control device 10 is configured to acquire parameter information 23 of each of the image acquiring parts 201 in a calibrating phase. For example, the parameter information 23 includes an internal parameter 231 and an external parameter 232. For example, the internal parameter 231 refers to a physical parameter of each of the image acquiring parts 201, and the external parameter 232 refers to a position relationship between the image acquiring parts 201.

Figure 2:
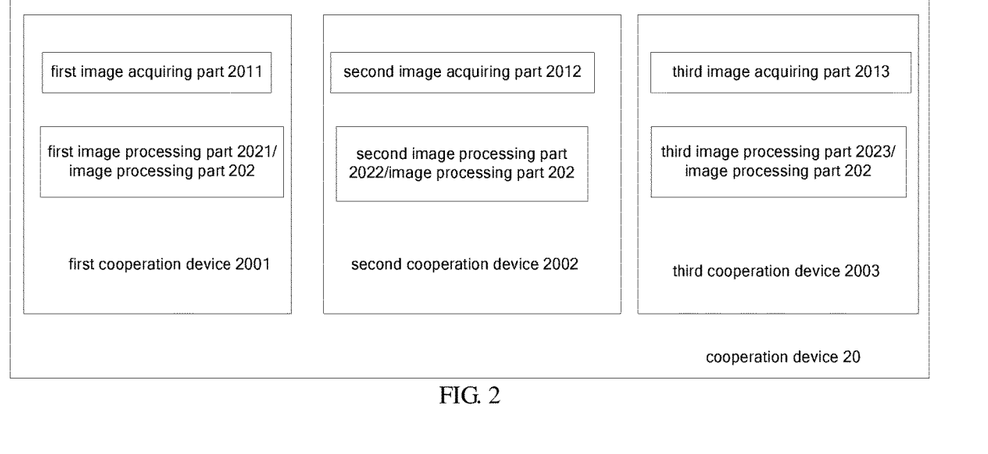
FIG. 2 is a schematic diagram illustrating cooperation devices of a stereo vision measuring system provided by an embodiment of the disclosure.

As illustrated in FIG. 2, according to a stereo vision measuring system provided by an embodiment of the disclosure, each of the cooperation devices 20 includes an image processing part 202, and the image processing part 202 can process the image captured by the image acquiring part 20 of the cooperation device 20 to which the image processing part 202 belongs. For example, the first cooperation device 2001 includes a first image processing part 2021, the second cooperation device 2002 includes a second image processing part 2022 and the third cooperation device 2003 includes a third image processing part 2023.

Figure 3:
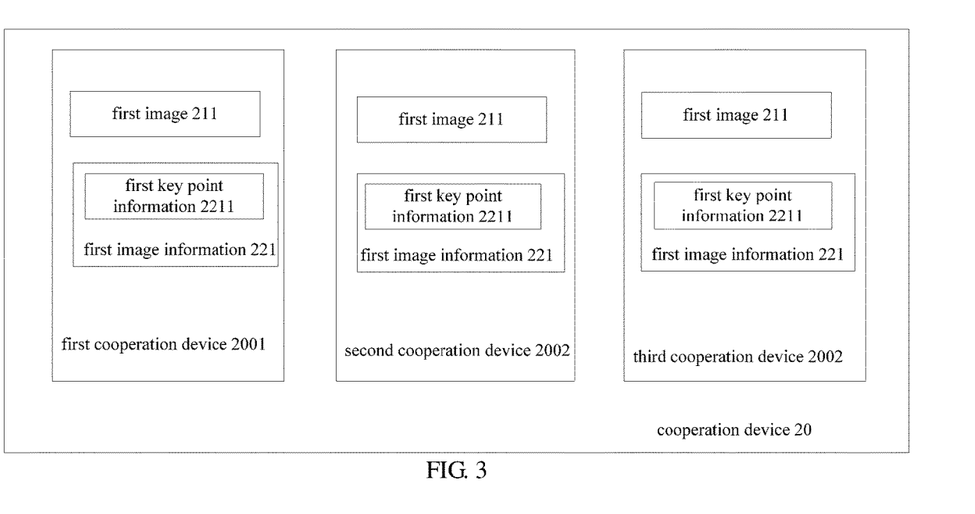
FIG. 3 is a schematic diagram illustrating a first image and first image information acquired by each of the cooperation devices, in a calibrating phase, of a stereo vision measuring system, provided by an embodiment of the disclosure.

FIG. 3 illustrates a schematic diagram illustrating a first image 211 and first image information 211 acquired by each of the cooperation devices, in the calibrating phase, of a stereo vision measuring system provided by an embodiment of the disclosure. As illustrated in FIG. 3, each of the cooperation devices 20 is configured to acquire the first image 211 of the first scene and the first image information 221 of the first image 211, and transmit the first image 211 and the first image information 221 to the main control device 10.

For example, in the calibrating phase, the scene is referred as the first scene, and the first scene can be changed. For example, the user can adjust the gesture, the first images can be different according to different scenes, and the first scene can be continuously captured (shot) to form a video. For example, the first images can be images in different view angles of the same scene at the same time.

For example, the first image information 221 includes first key point information 2211, and the image processing part 202 is configured to extract the first key point information 2211 of the first image 211. The first key point information 2211 includes a scale-invariant feature transform (SIFT) key point and/or a Harris corner point etc. The scale-invariant feature transform (SIFT) method is a common local feature extraction method which can transform the image data into a scale-invariant coordinate based on the local feature. For example, the SIFT method firstly detects the significant structures of the image, i.e. dimension space extreme points, and these significant structures are usually referred as key points or feature points in the image. Corner points refer to points of an image where gray level has a great change.

For example, the cooperation device can be served as a cooperation and calculation device of the main control device, and the cooperation device performs an analysis of a video content and transmits a recognition result to the main control device. For example, the key points can include at least one of body parts of a human. For example, the key points can include at least one of an eye brow, an eye, an ear, a nose and a mouth, a hand, an arm, a leg and a foot etc., but they are not limited to this, and can be selected according to needs. For example, each of the key points has three pieces of information: a position, a dimension, and a direction. Thus, a SIFT feature region can be determined. For example, in an image process, the key point refers to a point where an image gray level changes greatly or a point at an edge of the image where a large curvature is located (i.e. an intersection of two edges). The key points of an image are very important in the image matching algorithm based on the key point. The key point of an image can reflect essential features of an image, and can recognize a target objection of the image. Matching images can be completed by matching the key points.

Figure 4:
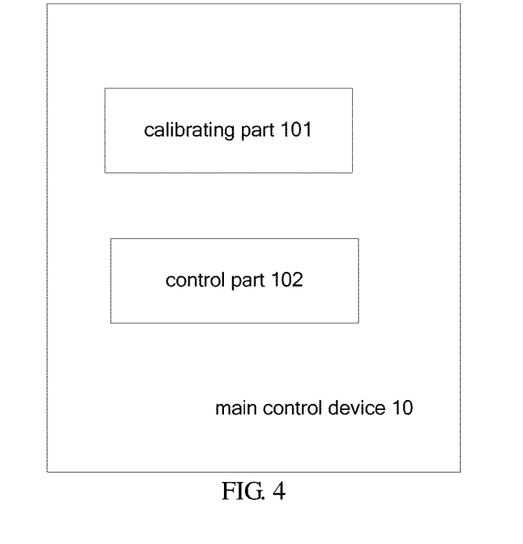
FIG. 4 is a schematic diagram illustrating a main control device of a stereo vision measuring system provided by another embodiment of the disclosure.

FIG. 4 is a schematic diagram illustrating a main control device of a stereo vision measuring system provided by an embodiment of the disclosure. According to the stereo vision measuring system provided by the embodiment of the disclosure, the main control device 10 includes a calibrating part 101.

As illustrated in FIG. 4, according to the stereo vision measuring system provided by an embodiment of the disclosure, the main control device 10 can further include a control part 102, and the control part 102 can be configured to control each of the cooperation devices 20. For example, the control part 102 can transmit an instruction to each of the cooperation devices 20.

Figure 5:
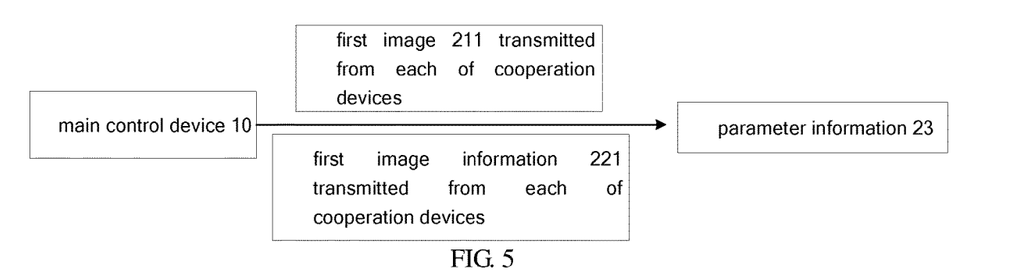
FIG. 5 is a schematic diagram illustrating obtaining parameter information by each of the image acquiring parts by a main device of a stereo vision measuring system provided by an embodiment of the parameter information.

FIG. 5 illustrates a schematic diagram illustrating acquiring the internal parameter 231 and the external parameter 232 of each of the image acquiring parts 201 by the main control device 10, according to the first image 211 and the first image information 221 transmitted from each of the cooperation devices 20, of a stereo vision measuring system provided by an embodiment of the disclosure. As illustrated in FIG. 5, the calibrating part 101 can be configured to acquire the parameter information, for example, the internal parameter 231 and the external parameter 232, of each of the image acquiring parts 201, according to the first image 211 and the first image information 221 transmitted from each of the cooperation devices 20. The main control device can control the cooperation devices to complete the calibrating of the entire vision measuring system.

Figure 6:
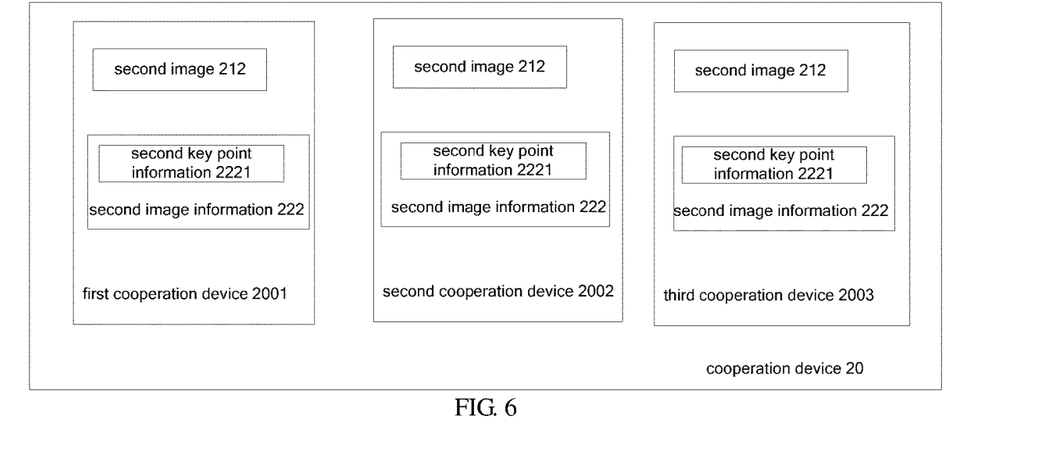
FIG. 6 is a schematic diagram illustrating a second image and second image information acquired by each of the cooperation devices, in a measuring phase, of a stereo vision measuring system provided by an embodiment of the disclosure.

FIG. 6 illustrates a schematic diagram illustrating the second image 212 and the second image information 222 acquired by each of the cooperation devices 20, in the measuring phase, of a stereo vision measuring system provided by an embodiment of the disclosure. For example, as illustrated in FIG. 6, each of the cooperation devices is further configured to acquire the second image 212 of the second scene and the second image information 222 of the second image 21, and transmit the second image information 222 to the main control device 10, in the measuring phase. For example, the image acquiring part 201 of each of the cooperation devices 20 acquires the second image 212 and the second image information 222, under a control of the main control device 10. For example, the image acquiring part 201 of each of the cooperation devices 20 acquires the second image 212 of the second scene in a measuring phase, the image processing part 202 can process the second image acquired by the image acquiring part 201 of the cooperation device 20 to which the image processing part 202 belongs, to obtain the second image information 222. The second image 21 can be different according to different scenes. For example, the second image 212 can be acquired by each of the image acquiring parts 201 (for example, including the first image acquiring part 2011, the second image acquiring part 2012 and the second image acquiring part 2013) of each of the cooperation devices 20.

For example, in the measuring phase, the scene is referred as the second scene, the second scene can be changed (for instance, the user can adjust the gesture), and the second scene can be continuously captured (shot) to form a video. For example, the second images can be images in different view angles of the same scene at the same time. The second image can be different according to different scenes. For example, the second image information 222 includes second key point information 2221, and the image processing part 202 can be further configured to extract the second key point information 2221 of the second image 212. The second key point information 2221 can also include a SIFT key point and/or a Harris corner point etc., and the previous description of the SIFT key point and/or the Harris corner point can be referred to.

Figure 7:
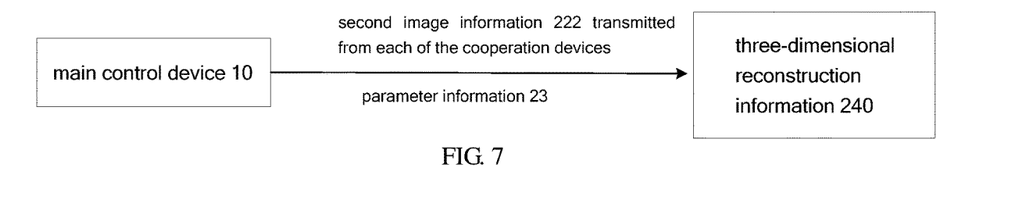
FIG. 7 is a schematic diagram illustrating obtaining three-dimensional reconstruction information by a main control device of a stereo vision measuring system, provided by an embodiment of the disclosure.

As illustrated in FIG. 7, the main control device 10 can be configured to obtain three-dimensional reconstruction information 240 of the second scene according to the parameter information 23 and the second image information 222 in the measuring phase. The main control device can be responsible for communicating with a required software (for example, somatosensory games and AR/VR applications etc.) of a third party, establishing the connection and control with the cooperation devices, and synthesizing the recognized results of the image acquiring parts of the respective cooperation devices, to obtain the three-dimensional reconstruction data of the current scene. The video is usually processed in real time in the measuring phase, the cooperation device may not transmit an entire image to the main control device 10, but transmits the second key point information to the main control device 10, otherwise the system transport load will be largely increased and it is unnecessary to transmit the entire image.

At least one embodiment of the disclosure provides a stereo vision measuring system. The image acquiring part of each of the cooperation devices can be shared to the main control device, to establish the three-dimensional vision reconstruction system with a plurality of the image acquiring parts, by using the main control device as a control (main control) center and using a plurality of the cooperation devices as the customer terminals, to solve the problem that the user needs to purchase an additional three-dimensional measuring device, and the problems such as the conventional device cannot measure accurately and use length is restricted, etc. Because each of the cooperation devices is movable and the position relationship between the cooperation devices are adjustable, the relative position of the plurality of the cooperation devices can be arranged flexibly, to achieve the long distance/adjustable distance stereo measurement with a plurality of the image acquiring parts, so as to measure more flexibly and accurately, which can provide a more accurate solution to various somatosensory games and AR/VR applications based on the stereo vision measurement, so that vision experience of a user can be greatly improved.

For example, the main control device 10 includes a smart television, the cooperation device 20 includes a movable terminal, the movable terminal includes a smart phone or a tablet, and the image acquiring part includes a camera. For example, the internal parameter refers to a physical parameter such as a focal length of the image acquiring part itself, etc., and the external parameter refers to a position relationship, such as rotating and/or positional changing between cameras etc. Only after a combination of the image acquiring parts is calibrated, the stereo vision measurement can be achieved.

The stereo vision measuring system provided by the at least one embodiment of the disclosure can fully utilize current recourse from the user and a long distance (a long base line) stereo vision measuring system with a plurality of cameras can be established without purchasing an additional three-dimensional measuring device, such as the Kinect from Microsoft, which will greatly promote the development of related arts.

Figure 8:
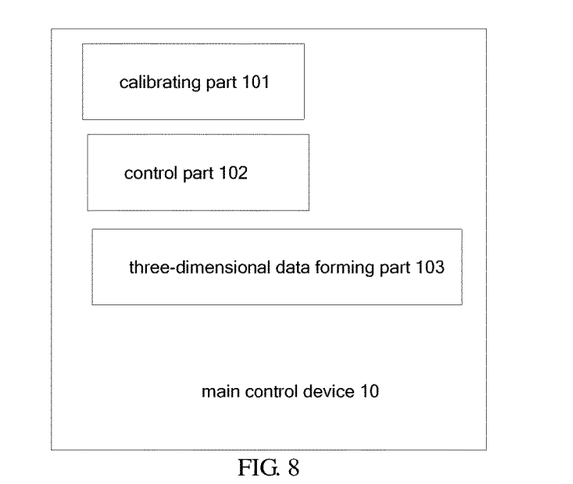
FIG. 8 is a schematic diagram illustrating a main control device of a stereo vision measuring system provided by another embodiment of the disclosure.

FIG. 8 is a schematic diagram illustrating a main control device of a stereo vision measuring system provided by an embodiment of the disclosure. According to the stereo vision measuring system provided by the embodiment of the disclosure, as illustrated in FIG. 8, the main control device 10 includes a three-dimensional data forming part 103. The three-dimensional data forming part 103 is configured to obtain three-dimensional reconstruction information 240 according to the parameter information (including the internal parameter 231 and the external parameter 232, for example) and the second image information 222 transmitted from each of the cooperation devices 20. The three-dimensional reconstruction can be performed according to the second image information 222 (the second key point information 221) of the second images 212 in different view angles of the same scene at the same time, transmitted from each of the cooperation devices 20.

Figure 9:
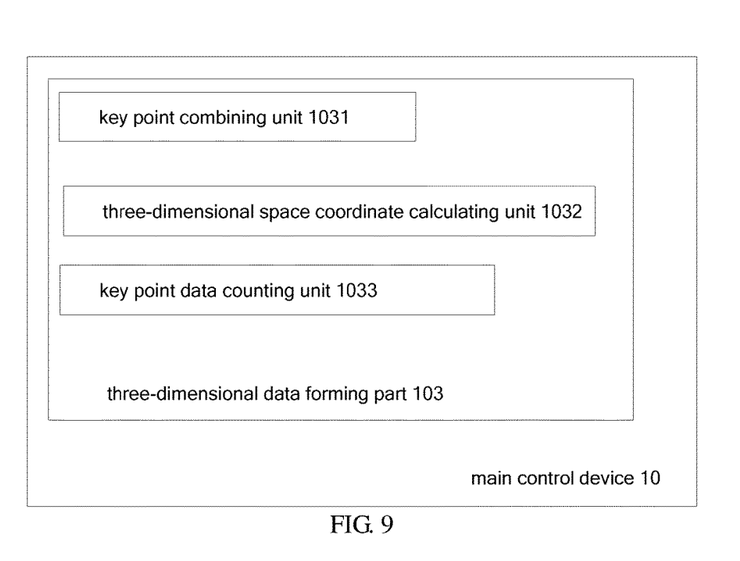
FIG. 9 is a schematic diagram illustrating a main control device of a stereo vision measuring system provided by another embodiment of the disclosure.

FIG. 9 illustrates a schematic diagram illustrating a three-dimensional data forming part 103 of a stereo vision measuring system provided by an embodiment of the disclosure. According to the stereo vision measuring system provided by the embodiment of the disclosure, as illustrated in FIG. 9, the three-dimensional data forming part 103 includes a key point combining unit 1031, a three-dimensional space coordinate calculating unit 1032 and a key point data counting unit 1033.

For example, the key point combining unit 1031 is configured to perform key point matching to select a key point combination that is successfully matched according to the second key point information 2221 transmitted from each of the cooperation devices 20. For example, the eyes, the nose and the mouth can be used as a key point combination, and of course, other manners of the key point combination can also be adopted.

For example, the three-dimensional space coordinate calculating unit 1032 is configured to calculate the three-dimensional space coordinate of the key point combination (each of the key points) according to the key point combination and the parameter information 23 (including the internal parameters 231 and the external parameters 232, for example). For example, the three-dimensional space coordinate of the eyes, the nose and the mouth can be obtained according to a combination of the eyes, the nose and the mouth as well as the parameter information 23.

For example, the key point data counting unit 1033 is configured to count key point data of a key region. For example, the body gesture can be synthesized, and thus the stereo vision calculation is completed, to obtain the three-dimensional reconstruction information 240. For example, the key region includes a face and limbs of a human etc. For example, the three dimensional reconstruction information 240 of a human body (for example, the user) can be obtained according to the key point data such as the face and the limbs etc. For example, the three-dimensional reconstruction information 240 can includes the three-dimensional reconstruction information of a face and a body gesture of a human etc. For example, the second image information is mainly of acquiring information of a user in a scene, for example, features such as the face and the limbs of the user etc., so as to form the information such as the face and the posture features etc.

Figure 10:
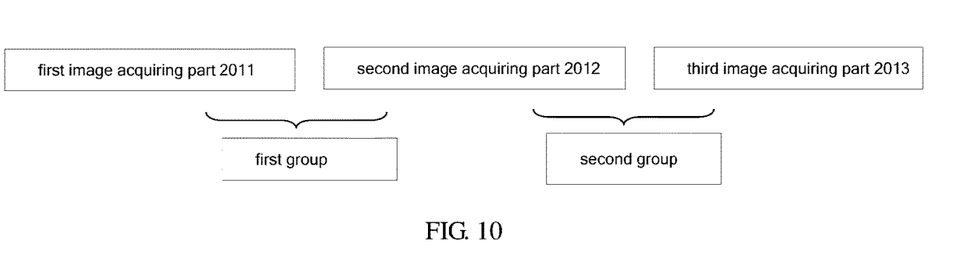
FIG. 10 is a schematic diagram illustrating dividing two adjacent image acquiring parts as a group in a stereo vision measuring system provided by an embodiment of the disclosure.

As illustrated in FIG. 10, according to a stereo vision measuring system provided by an embodiment of the disclosure, in order to improve the accuracy of the calibration, the calibrating part 101 is configured to divide the image acquiring parts 201 into groups, each of the groups includes two of the image acquiring parts, and the image acquiring parts 201 are matched in pairs to be calibrated. For example, the first image acquiring part 2011, the second image acquiring part 2012 and the third image acquiring part 2013 are arranged in sequence. The first image acquiring part 2011 and the second image acquiring part 2012 are in a first group, and the second image acquiring part 2012 and the third image acquiring part 2013 are in a second group. That is, two adjacent image acquiring parts 201 can be matched in pairs so as to calibrate the image acquiring parts 201. In FIG. 6, that three image acquiring parts are included is illustrated as an example.

Figure 11:
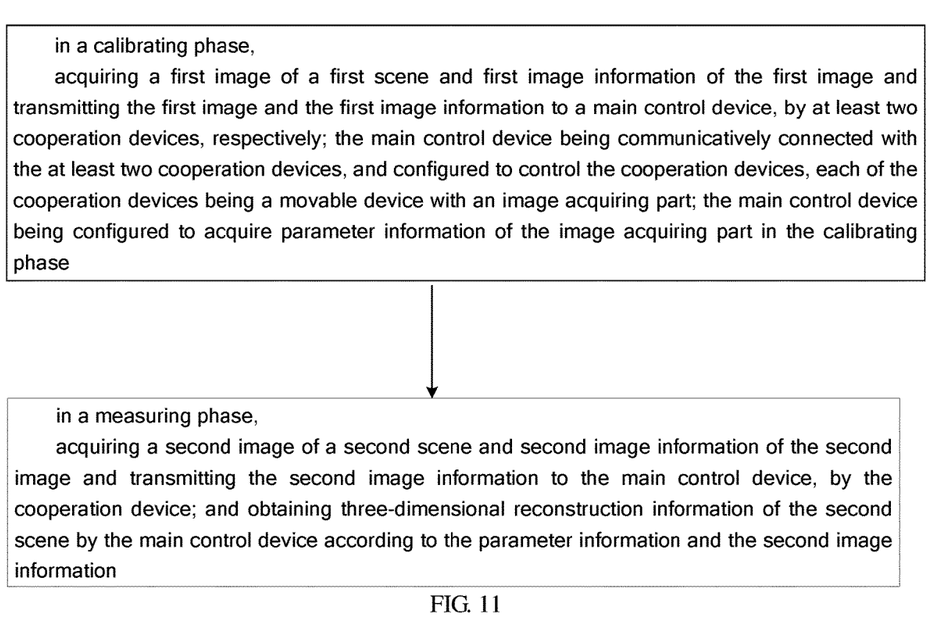
FIG. 11 is a schematic diagram illustrating a stereo vision measuring method provided by an embodiment of the disclosure.

As illustrated in FIG. 11, at least one embodiment of the disclosure provides a stereo vision measuring method, including following steps.

In a calibrating phase, acquiring a first image 211 of a first scene and first image information 221 of the first image 211, and transmitting the first image 211 and the first image information 221 to a main control device 10, by at least two cooperation devices 20, respectively, the main device 10 being communicatively connected with the at least two cooperation devices 20, and being configured to control each of the cooperation devices 20; each of the cooperation devices 20 being a movable device, and being provided with an image acquiring part 201; the main control device 10 being configured to acquire parameter information 23 of each of the image acquiring parts 201 in the calibrating phase.

In a measuring phase, acquiring a second image 212 of a second scene and second image information 222 of the second image 212, and transmitting the second image information 222 to the main control device 10, by each of the cooperation devices 20, respectively; and obtaining three-dimensional reconstruction information 240 of the second scene by the main control device 10.

The stereo vision measuring method provided by the at least one embodiment of the disclosure establishes the three-dimensional vision reconstruction system with a plurality of the image acquiring parts, to solve the problem that the user needs to purchase an additional three-dimensional measuring device, and the problem that the conventional device cannot measure accurately and use length is restricted, etc. Because each of the cooperation devices is movable and the position relationship between the cooperation devices are adjustable, the relative position of the plurality of the cooperation devices can be disposed flexibly, to achieve the long distance/adjustable distance stereo measuring with the plurality of the image acquiring parts. For example, the long distance refers to a longer distance between the image acquiring parts, for example, the adjustable distance refers to an adjustable distance between the image acquiring parts.

According to a stereo vision measuring method provided by an embodiment of the disclosure, the parameter information 23 of each of the image acquiring parts 201 is acquired according to the first image 211 and the first image information 221 transmitted from each of the cooperation devices 20. For example, the parameter information 23 includes an internal parameter 231 and an external parameter 232. The internal parameter 231 refers to a physical parameter of each of the image acquiring parts 201, and the external parameter 232 refers to a position relationship between the image acquiring parts 201.

According to a stereo vision measuring method provided by an embodiment of the disclosure, the three-dimensional reconstruction information 240 is obtained according to the parameter information 23 and the second image information 222 transmitted from each of the cooperation devices 20.

According to a stereo vision measuring method provided by an embodiment of the disclosure, the first image information 221 includes first key point information 2211 and the second image information 222 includes second key point information 2221. In order to facilitate the calibrating and measuring and reduce the network load, all of the first image information may not be transmitted, and only the first key point information 2211 is transmitted in the calibrating phase. All of the second image information may not be transmitted and only the second key point information 2221 is transmitted in the measuring phase.

According to a stereo vision measuring method provided by an embodiment of the disclosure, the method further includes: performing a key point matching according to the second key point information transmitted from each of the cooperation devices 20 to select a key point combination that is successfully matched; calculating to obtain a three-dimensional space coordinate according to the key point combination, the internal parameter 231 and the external parameter 232; counting the key point data of a key region, to complete the stereo vision calculation, so as to obtain the three-dimensional reconstruction information 240. The three-dimensional reconstruction information 240 can also be obtained by other manner and is not limited by the embodiment of the disclosure.

According to a stereo vision measuring method provided by an embodiment of the disclosure, in order to reduce errors in the calibrating phase and/or in the measuring phase and improve the accuracy, the image acquiring parts 201 can be matched in groups by the main control device 10, each of the groups includes two of the image acquiring parts 201 and thus a plurality of groups of binocular stereo vision measuring units can be formed. For example, the matching error of key points of an image and the like can be reduced.

According to a stereo vision measuring method provided by an embodiment of the disclosure, in order to avoid the delay caused by the blocking of the wireless network and image capturing of the cooperation devices etc., the method can further include synchronizing signals of the main control device 10 and the cooperation device 20 in the calibrating phase and/or in the measuring phase, and synchronizing signals of the main control device 10 and the cooperation device 20 includes: acquiring network delay or synchronously acquiring.

For example, the acquiring network delay includes: continuously transmitting two messages to the cooperation device by the main control device 10, and immediately returning them after receiving them by the cooperation device 20. A time interval of receiving two returned messages by the main control device is the network delay of the communication between the main control device 10 and the cooperation device 20.

For example, the synchronously acquiring includes: respectively transmitting a first time stamp and a collect instruction to each of the cooperation devices 20 by the main control device 10, obtaining the collect instruction and acquiring the image by the cooperation devices 20, returning a second time stamp and image information obtained from processing the image to the main control device 10, by the cooperation device; and aligning the image information of the cooperation devices 20 according to the second time stamp by the main control device. The image includes the first image 211 or the second image 212, and the image information includes the first image information 2211 or the second image information 2221. It can be determined whether the first image information 2211 or the second image information 2221 is transmitted according to whether the method is in the calibrating phase or in the measuring phase.

According to a stereo vision measuring method provided by an embodiment of the disclosure, the main control device 10 includes a smart television and the cooperation device includes a movable terminal.

Figure 12:
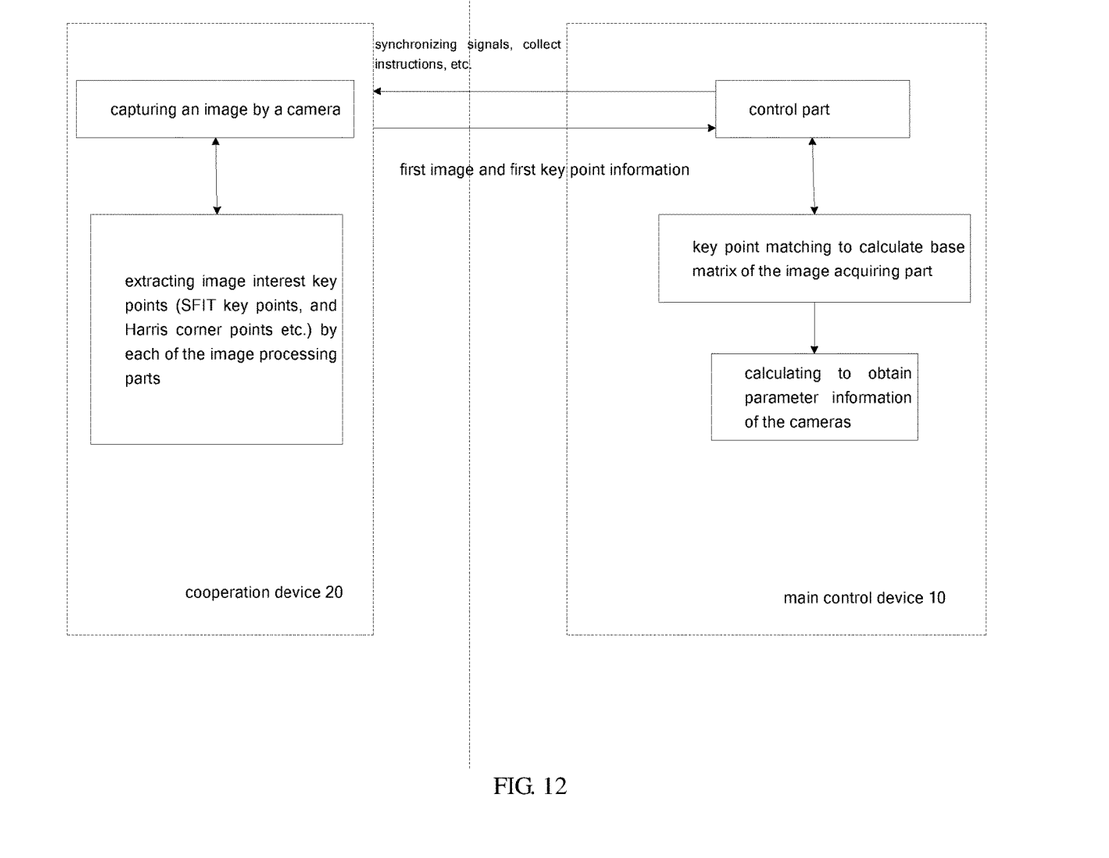
FIG. 12 is a schematic diagram illustrating a calibrating phase of a stereo vision measuring method provided by an embodiment of the disclosure.
Figure 13:
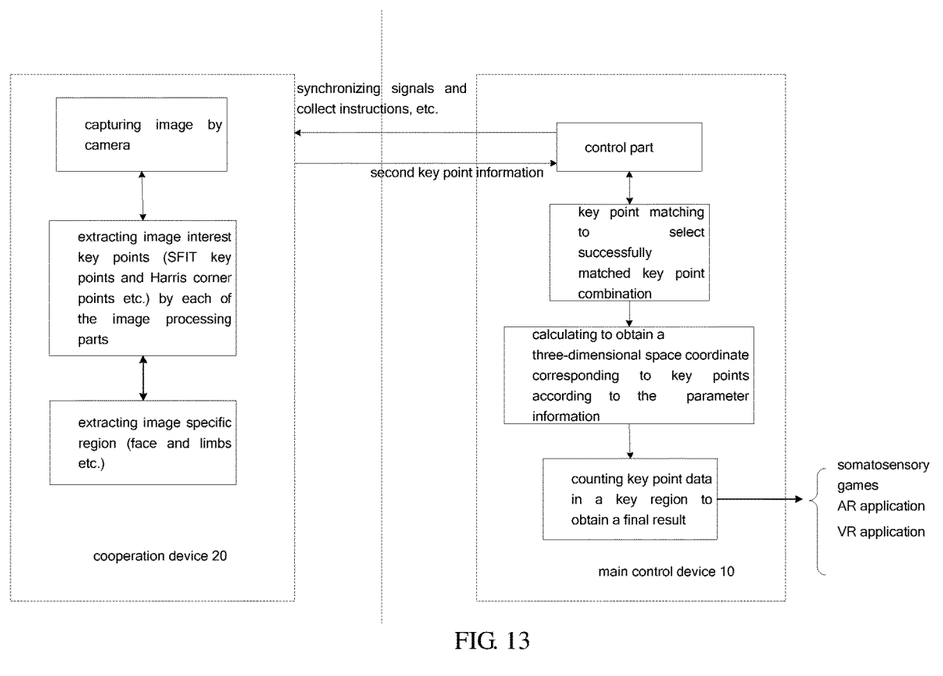
FIG. 13 is a schematic diagram illustrating a measuring phase of a stereo vision measuring method provided by an embodiment of the disclosure.

Referring to FIG. 12 and FIG. 13, an example in which the main control device is a smart television, the cooperation device is a smart phone and the image acquiring part is a camera of the smart phone is illustrated for description.

The calibrating refers to that parameter information (the internal parameter and the external parameter) of current camera combination requires to be acquired by a certain manner after the user places the smart phone on a fixed position; the measuring refers to that the smart television controls each of the smart phones to complete capturing and calculating images of a current scene, to acquire the three-dimensional data information (three-dimensional reconstruction information) of the user in the scene after the system establishment is completed.

As illustrated in FIG. 12, the calibrating phase can include following steps.

1. The user places more than two smart phones on proper positions of the scene, corresponding softwares of the smart television and the smart phone are opened, and the smart television is served as the main control center, to search each of the smart phones in the current local network; the camera is turned on by the smart phone.

2. The user stands in middle of the scene, and can open arms, the smart television transmits an instruction, to control the smart phones to synchronously and continuously acquire first images of the first scene, and the smart phone obtains key points (SIFT key points/Harris corner points, etc.) of the first images. Then, the first image and the first image information (key point information) are transmitted to the smart television.

3. The user changes his/her gesture and the system repeats a previous step of the calculation flow.

4. The smart television uses the calibrating part to calibrate so as to acquire the internal parameter and the external parameter of the current camera combination according to the acquired first image and the first image information (the first key point information) from different cameras, and can record them in the un-erasable memory of the smart television. The calibrating is completed.

In a practice calibrating process, the television interface can guide the user to complete the calibrating steps by playing corresponding pictures and real-time images; if more than two smart phones are placed, the system can perform calibrating for two adjacent cameras which are matched in pair, and no additional activity is needed for the user.

As illustrated in FIG. 13, the measuring phase can include following steps.

1. After the user completes the calibrating of the camera combination, the system can perform the three-dimensional stereo measuring which is substantially similar to the calibrating phase. Firstly, the smart television is served as the main control center, to search a plurality of smart phones in the current local network and control the smart phones to turn on the camera.

2. The smart television transmits an instruction, to control the smart phones to synchronously and continuously acquire the second image of the second scene, and the smart phone acquires the second image information (the second key point information) by the image processing part. Considering that most of applications based on the stereo vision interact with the user, the smart phone can also perform a higher level analysis such as face recognition and body gesture detection etc. Then, the smart phone can transmit the second key point information and a recognized result to the smart television. For example, because the video is usually processed in real-time in the measuring phase, it is unnecessary for the smart phone terminal to transmit an entire image to the television terminal, and only the second key point information can be transmitted to the second key point information, otherwise the system transport load will be greatly increased, and it is unnecessary to transmit an entire image.

3. The smart television first performs key point matching to select a key point combination that is successfully matched according to the second key point information acquired from different cameras. Then, the three-dimensional space coordinate is obtained according to the internal parameter and the external parameter of the cameras as pre-calibrated. Finally, the key point data in the key region (the face/limbs etc.) is counted, to complete the stereo vision calculation of the current scene.

In addition, because of the delay caused by blocking of wireless network and image capturing of the phone camera, a synchronous signal is added to the communication between the smart television and the smart phone, which is realized by ways including acquiring the network delay and/or synchronously acquiring.

1. The acquiring networking delay includes: continuously transmitting two messages to the cooperation device by the smart television, and immediately returning them after receiving them by the smart phone. A time interval of receiving two returned messages by the smart television is the network delay of the communication between the smart television and the smart phone.

2. The synchronously acquiring includes: using 64-bit system time of the smart television as a time stamp by the smart television, and transmitting a first time stamp and an collect instruction to the smart phone by the smart television; returning a second time stamp and processed data to the smart television; obtaining the instruction and perform a capture to obtain an image by the smart phone; and aligning the processed data from each of the smart phones by the smart television according to the second time stamp.

The signal synchronization can be performed by adopting any one of the above-mentioned methods at one or both of the calibrating phase and the measuring phase.

In the measuring phase, when the user places more than two smart phones in the system, the control part of the smart television can group adjacent smart phones in pairs, to form a plurality of groups of binocular stereo vision measuring unit, which can further reduce errors, for example, the matching error of key points of an image, etc., of respective phases of the system.

The three-dimensional stereo vision measuring system can be established by the smart television in combination with the smart phones; the smart television is served as a main control center, and the smart phone is served as a cooperation customer terminal, to provide the camera and the calculation resource. The stereo vision measuring method can be divided into two phases: a calibrating phase and a measuring phase, and the calibrating method can adopt a self-calibration algorithm based on the scene key point detection. When the number of the smart phones is more than two, the system can form a plurality of binocular stereo vision combinations, to reach a more accurate measuring.

The stereo vision measuring system of the embodiment of the disclosure can further includes one or more processors and one or more memories. The processor can process data signals and can includes various calculation structures, for example, a complex instruction set computer (CISC) structure, a reduced instruction set computer (RISC) structure or a structure which implements various instruction set combinations. The memory can store instructions and/or data executed by the processor. These instructions and/or data can include code for implementing some or all of functions of one or more device(s), component(s) or unit(s). For example, the memory includes a dynamic random access memory (DRAM), a static random access memory (SRAM), a flash memory, an optical memory, or other memories well known by those skills in the art.

In some embodiments of the disclosure, components/units, such as the image processing part, the calibrating part, the three-dimensional data forming part, the key point combining unit, the three-dimensional space coordinate calculating unit and the key point data counting unit, include codes and programs stored in the memories; the processor can execute the codes and programs to implement some or all of functions of any one of the parts/units as mentioned above.

In some embodiments of the disclosure, the image processing part, the calibrating part, the three-dimensional data information part, the key point combining unit, the three-dimensional space coordinate calculating unit, and the key point data counting unit etc. can be special hardware devices, to implement some or all of functions of the image processing part, the calibrating part, the three-dimensional data information part, the key point combining unit, the three-dimensional space coordinate calculating unit, and the key point data counting unit etc. as mentioned above. For example, the image processing part, the calibrating part, the three-dimensional data information part, the key point combining unit, the three-dimensional space coordinate calculating unit, and the key point data counting unit etc. can be one circuit board or a combination of circuit boards, to implement the above mentioned functions. In the embodiment of the disclosure, the one circuit board or the combination of the circuit boards can include: (1) one or more processor); (2) one or more non-transient computer readable memories connected with the processor(s); and (3) a firmware stored in the memory and executable by the processor.

The following statements should be noted:

(1) Unless otherwise defined, the same reference sign represents the same meaning in the embodiments of the disclosure and accompanying drawings.

(2) The accompanying drawings involve only the structure(s) in connection with the embodiment(s) of the present disclosure, and other structure(s) can be referred to common design(s).

(3) For the purpose of clarity only, in accompanying drawings for illustrating the embodiment(s) of the present disclosure, the thickness and size of a layer or a structure may be enlarged. However, it should understood that, in the case in which a component or element such as a layer, film, area, substrate or the like is referred to be "on" or "under" another component or element, it may be directly on or under the another component or element or a component or element is interposed therebetween.

(4) In case of no conflict, features in one embodiment or in different embodiments can be combined.

What are described above is the embodiments of the disclosure only and not limitative to the scope of the disclosure; any of those skilled in related arts can easily conceive variations and substitutions in the technical scopes disclosed by the disclosure, which should be encompassed in protection scopes of the disclosure. Therefore, the scopes of the disclosure should be defined in the appended claims.

The invention claimed is:

1. A stereo vision measuring system, comprising a main control device and at least three cooperation devices, wherein the main device is communicatively connected with the at least three cooperation devices and configured to control the cooperation devices; each of the cooperation devices is a movable device with an image acquiring part;

the cooperation device is configured to acquire a first image of a first scene and first image information of the first image and transmit the first image and the first image information to the main control device in a calibrating phase, and the cooperation device is further configured to acquire a second image of a second scene and second image information of the second image and transmit the second image information to the main control device in a measuring phase;

the main control device is configured to acquire parameter information of the image acquiring parts in the calibrating phase; the main control device is further configured to obtain three-dimensional reconstruction information of the second scene according to the parameter information and the second image information in the measuring phase, wherein at least three image acquiring parts are provided, the calibrating part is configured to divide the at least three image acquiring parts into groups, each of the groups comprises two adjacent image acquiring parts, and the at least three image acquiring parts are matched in pairs to be calibrated, and a count of the groups formed by the at least three image acquiring parts is less than a count of the at least three image acquiring parts.

2. The stereo vision measuring system according to claim 1, wherein the main control device comprises a calibrating part configured to acquire the parameter information of the image acquiring parts according to the first image and the first image information transmitted from the cooperation device, wherein the parameter information comprises an internal parameter and an external parameter, the internal parameter is a physical parameter of the image acquiring part, and the external parameter is a position relationship between the image acquiring parts.

3. The stereo vision measuring system according to claim 1, wherein the main control device comprises a three-dimensional data forming part configured to obtain the three-dimensional reconstruction information according to the parameter information and the second image information transmitted from the cooperation device.

4. The stereo vision measuring system according to claim 3, wherein the cooperation device comprises an image processing part, the first image information comprises first key point information, the second image information comprises second key point information, and the image processing part is configured to extract the first key point information in the calibrating phase and extract the second key point information in the measuring phase.

5. The stereo vision measuring system according to claim 4, wherein the three-dimensional data forming part comprises a key point combining unit, a three-dimensional space coordinate calculating unit and a key point data counting unit, the key point combining unit is configured to perform key point matching according to the second key point information transmitted from the cooperation device to select a key point combination that is successfully matched, the three-dimensional space coordinate calculating unit is configured to calculate to obtain a three-dimensional space coordinate of the key point combination according to the key point combination and the parameter information; the key point data counting unit is configured to count key point data of a key region, to complete stereo vision calculation, and obtain the three-dimensional reconstruction information.

6. The stereo vision measuring system according to claim 1, wherein the main control device comprises a smart television and the cooperation device comprises a movable terminal.

7. A stereo vision measuring method, comprising:

in a calibrating phase, acquiring a first image of a first scene and first image information of the first image and transmitting the first image and the first image information to a main control device, by at least three cooperation devices, respectively; the main control device being communicatively connected with the at least three cooperation devices, and configured to control the cooperation devices, each of the cooperation devices being a movable device with an image acquiring part; the main control device being configured to acquire parameter information of the image acquiring pan in the calibrating phase;

in a measuring phase, acquiring a second image of a second scene and second image information of the second image and transmitting the second image information to the main control device, by the cooperation device; and obtaining three-dimensional reconstruction information of the second scene by the main control device according to the parameter information and the second image information, wherein at least three image acquiring parts are provided, the at least three image acquiring parts are divided into groups, each of the groups comprises two adjacent image acquiring parts, and the at least three image acquiring parts are matched in pairs to be calibrated, and a count of the groups formed by the at least three image acquiring parts is less than a count of the at least three image acquiring parts.

8. The stereo vision measuring method according to claim 7, further comprising determining the parameter information of the image acquiring parts according to the first image and the first image information transmitted from the cooperation device, by the main control device, wherein the parameter information comprises an internal parameter and an external parameter, the internal parameter is a physical parameter of the image acquiring part, and the external parameter is a position relationship between the image acquiring parts.

9. The stereo vision measuring method according to claim 8, wherein the first image information comprises first key point information, and the second image information comprises a second key point information.

10. The stereo vision measuring method according to claim 9, further comprising: performing a key point matching according to the second key point information transmitted from the cooperation device to select a key point combination that is successfully matched, and calculating to obtain a three-dimensional space coordinate of the key point combination according to the key point combination and the parameter information; counting key point data in a key point region, to complete stereo vision calculation and obtain the three-dimensional reconstruction information.

11. The stereo vision measuring method according to claim 7, wherein the image acquiring parts are divided into groups by the main control device, and each of the groups forms a binocular stereo vision measuring unit.

12. The stereo vision measuring method according to claim 7, further comprising, synchronizing signals of the main control device and the cooperation device in at least one of the calibrating phase and the measuring phase, wherein synchronizing signals of the main control device and the cooperation devices comprises: acquiring network delay.

13. The stereo vision measuring method according to claim 12, wherein acquiring the network delay comprises: continuously transmitting two messages to the cooperation device by the main control device, and immediately returning them after receiving them by the cooperation device, wherein a time interval of receiving the two returned messages by the main control device is the network delay of communication between the main control device and the cooperation device.

14. The stereo vision measuring method according to claim 7, further comprising, synchronizing signals of the main control device and the cooperation device, in at least one of the calibrating phase and the measuring phase.

15. The stereo vision measuring method according to claim 14, wherein synchronizing signals of the main device and the cooperation device comprising: synchronously acquiring;

the synchronously acquiring comprises:

transmitting a first time stamp and a collect instruction together to the cooperation device by the main control device, obtaining the collect instruction and acquiring an image by the cooperation device, returning a second time stamp and image information obtained from processing the image to the main control device by the cooperation device; and aligning the image information of the cooperation devices by the main control device according to the second time stamp received by the main control device, the image comprising the first image or the second image, and the image information comprising the first image information or the second image information.

16. The stereo vision measuring method according to claim 7, wherein the main control device comprises a smart television, and the cooperation device comprises a movable terminal.

17. The stereo vision measuring system according to claim 1, wherein the at least three image acquiring parts are arranged in sequence, the two image acquiring parts with a furthest distance are not matched in pairs to be calibrated.

18. The stereo vision measuring system according to claim 1, wherein a relative position of every two of the at least three image acquiring parts is adjustable in different calibrating phases.

19. The stereo vision measuring system according to claim 1, wherein the count of the groups formed by the at least three image acquiring parts is the count of the at least three image acquiring parts minus one.

20. The stereo vision measuring method according to claim 7, wherein a relative position of every two of the at least three image acquiring parts is adjustable in different calibrating phases.

* * * * *